2 Sheets—Sheet 1.
P. A. OLIVER.
GUNPOWDER PRESS AND GRAINER.
No. 10,965. Reissued Oct. 30, 1888.
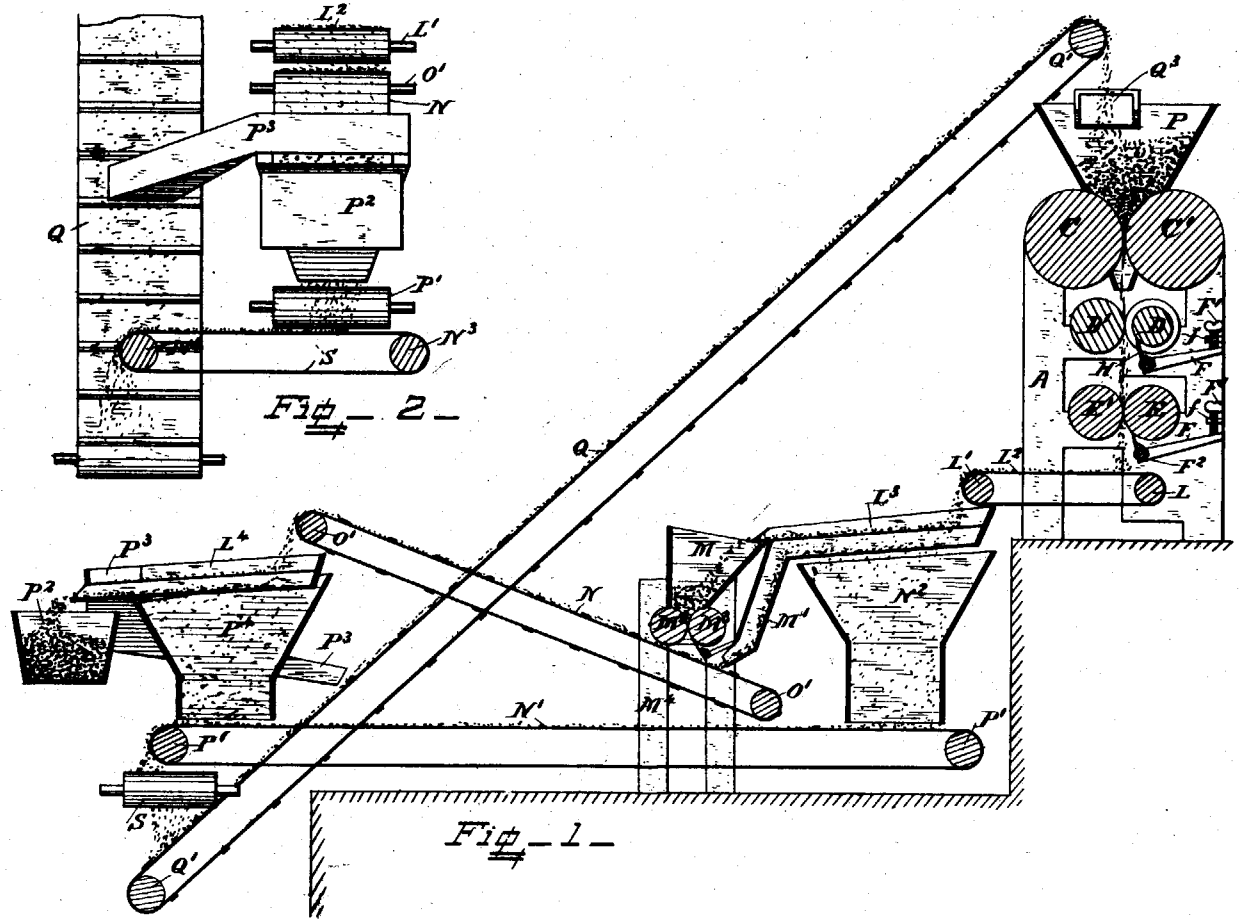
Witnesses.
W. D. Porter
L. B. Porter.
Inventor.
Paul A. Oliver.
By his Attorney
Herbert W. T. Jenner.

P. A. OLIVER.

GUNPOWDER PRESS AND GRAINER.

No. 10,965. Reissued Oct. 30, 1888.

Witnesses.

W. D. Porter.

L. B. Porter.

Inventor,

Paul A. Oliver.

By his Attorney

Herbert W. T. Jenner.

UNITED STATES PATENT OFFICE.

PAUL AMBROSE OLIVER, OF OLIVER'S MILLS, PENNSYLVANIA.

GUNPOWDER PRESS AND GRAINER.

SPECIFICATION forming part of Reissued Letters Patent No. 10,965, dated October 30, 1888.

Original No. 378,516, dated February 28, 1888. Application for reissue filed April 13, 1888. Serial No. 270,593.

*To all whom it may concern:*

Be it known that I, PAUL AMBROSE OLIVER, a citizen of the United States, residing at Oliver's Mills, in the county of Luzerne and State of Pennsylvania, have invented certain new and useful Improvements in a Gunpowder Press and Grainer; and I do hereby declare the following to be a full, clear, and exact description of the invention, such as will enable others skilled in the art to which it appertains to make and use the same.

This invention relates to machines for pressing and graining gunpowder. Patents for this purpose were issued to me, No. 101,032, dated March 22, 1870, and No. 134,438, dated December 31, 1872.

This invention consists in the novel construction and combination of the apparatus hereinafter fully described and claimed, which is an improvement upon the old machines and operates in a very superior manner.

Figure 3:
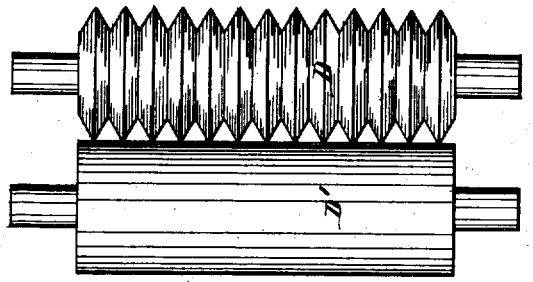
Figure 2A:
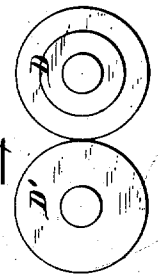
Figure 5:
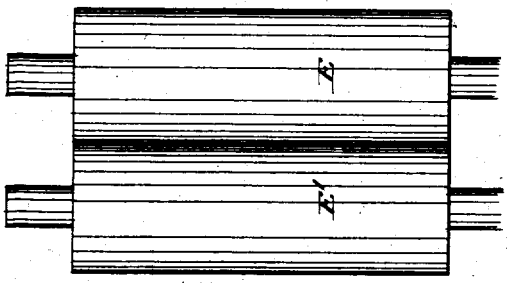
Figure 8:
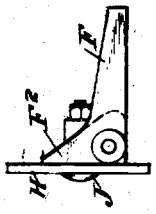
Figure 7:
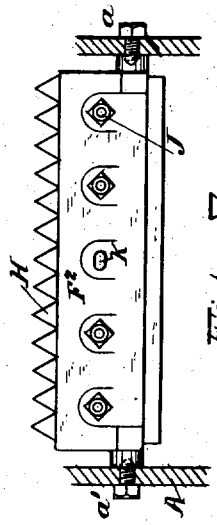
Figure 6:
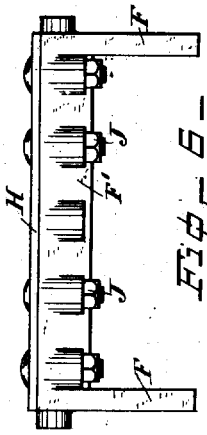

In the drawings, Figure 1 is a longitudinal vertical section through the entire apparatus. Fig. 2 is an end view of a portion of the apparatus. Figs. $2^a$, 3, 4, and 5 are respectively end and side views of the grainer-rolls. Figs. 6, 7, and 8 are respectively a plan, a side elevation, and an end view, of the scraper.

A is one of the side frames of the presser and grainer, the other side frame being similar to it.

P is a hopper into which the finely-ground powder from the mill is placed.

C C′ are the press-rolls, journaled at the lower part of the hopper between the side frames, and which press the fine moist powder into rough flat cakes.

Figure 4:
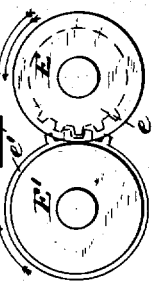

D D′ are the upper graining-rolls, driven at equal or unequal speed, of which D is grooved, so that it cuts the rough cakes into small pieces. The rolls E E′ are also graining-rolls, and both are smooth. The grooves on roll D have straight tapering sides, forming sharp knife-like edges. As the pressed powder cake passes between the grooved roll and the smooth roll, the sharp edges of the grooved roll cut it against the smooth roll and form it into cakes of moderate size, but do not crush or break the powder cake, the object being to cut it up only, forming as little fine dust as possible. The roll E is driven at a greater speed than roll E′, to finely granulate the powder, the intergearing wheels *c c′*, which connect the rolls, being of different diameters, as shown in Fig. 4. The fast-driving roll E and the roll D are each provided with a scraper, H, for cleaning them. These scrapers conform to the outline of the rolls, but otherwise are exactly alike. The slow-moving roll does not require a scraper, as the motion of the fast-moving roll keeps it clean.

$F^2$ is a cross-bar pivoted upon the screws *a* to the side frames. This cross-bar is provided with elongated bolt-holes K and bolts J, for securing the scraper H and adjusting it laterally when grooved. It has also the arms F projecting from it on the opposite side of the pivots from the scraper.

F′ are thumb-screws working in screw-threaded lugs *f*, projecting from the side frames, which screws bear upon the ends of the arms and afford a means for setting up the scrapers against the rolls.

The granulated powder falls from rolls E E′ onto the conveyer-belt $L^2$, which works over rollers L L′ and discharges the powder into the double screen $L^3$. The coarse grains pass over the upper screen into hopper M, the medium grains pass over the lower screen down into the chute M′, and the fine dust falls through hopper $N^2$ onto the conveyer-belt N′.

$M^2$ $M^3$ are grainer-rolls similar to rolls E′ E. They granulate the coarse grains from hopper M and allow the powder to fall upon the elevator belt N, together with the powder from the chute M′.

The elevator-belt N works over rollers O′ and discharges the powder into the double screen $L^4$. The coarse grains pass over the upper screen, down the chute $P^3$, and onto the elevator Q. The good grains pass over the lower screen and into the hopper $P^2$, from whence they may be removed as they accumulate, and the fine dust falls through the hopper $P^4$ onto the said conveyer-belt N′.

P′ are the rollers over which the conveyer-belt N′ works. This belt N′ conveys the fine dust from hoppers $N^2$ and $P^4$ and discharges it onto a similar conveyer-belt, S, working over rollers $N^3$ $N^4$, which in turn delivers it onto the elevator-belt Q. The elevator-belt Q works over rollers Q′, raises all the coarse grains from chute $P^3$ and the fine dust from belt S, and delivers the same down the chute $Q^3$ into the aforesaid hopper P, to be reacted on by the press-rolls.

The double screens $L^3$ and $L^4$ are preferably shaking screens; but stationary inclined or revolving screens may also be used.

I am aware that it is not new to press ground gunpowder into cakes by passing it through or between revolving rolls or other equivalent mechanism. The rolls or other pressing mechanism may also be variously located with reference to the graining-rolls. I prefer to use revolving rolls to press the ground powder, and to locate them, as set forth, above the graining-rolls, because the said rolls form a cheap and efficient press, and because the gunpowder cakes can then be fed direct to the graining-rolls.

What I claim is—

1, The combination of a pair of revoluble press-rolls for forming the ground powder into cakes, a pair of revoluble graining-rolls, one roll being grooved to cut up the cakes, a second pair of revoluble smooth graining-rolls driven at unequal speed, and a frame-work supporting all the said rolls in horizontally-arranged pairs, substantially as and for the purpose set forth.

2. The combination of a pair of revoluble press-rolls for forming the ground powder into cakes, a pair of graining-rolls journaled beneath the press-rolls, one roll being grooved to cut up said cakes, and a frame-work supporting the said rolls in horizontally-arranged pairs, substantially as and for the purpose set forth.

3. In a gunpowder-grainer, the combination, with a smooth roll, of a grooved roll having sharp knife-like edges which bear against the said smooth roll and cut the pressed powder cakes into small pieces, a serrated scraper bearing against the said cutting-roll, and a frame-work supporting the said rolls, so that they revolve in substantially the same horizontal plane.

4. The combination, with a pressing device for forming the ground powder into cakes, of a pair of graining-rolls supported in substantially the same horizontal plane, one of the said rolls being smooth and the other being provided with sharp knife-like edges which cut the descending pressed powder cakes into small pieces against the smooth surface of the other roll.

In testimony whereof I affix my signature in presence of two witnesses.

PAUL AMBROSE OLIVER.

Witnesses:
W. L. RAEDER,
JESSE OEHRIG.